(12) United States Patent
Arpac et al.

(10) Patent No.: US 6,291,070 B1
(45) Date of Patent: Sep. 18, 2001

(54) NANOSTRUCTURED MOULDED BODIES AND LAYERS AND METHOD FOR PRODUCING SAME

(75) Inventors: Ertugrul Arpac, Antalya (TR); Herbert Krug, Harrison City, PA (US); Peter Mueller, Illingen (DE); Peter W. Oliveira, Saabruecken (DE); Helmut Schmidt, Saarbruecken-Guedingen (DE); Stefan Sepeur, Wadgassen-Schaffhausen (DE); Bettina Werner, Dudweiler (DE)

(73) Assignee: Institut für Neue Materialien gemeinnützige GmbH, Saarbrücken (DE)

( * ) Notice: Subject to any disclaimer, the term of this patent is extended or adjusted under 35 U.S.C. 154(b) by 0 days.

(21) Appl. No.: 09/423,840

(22) PCT Filed: May 13, 1998

(86) PCT No.: PCT/EP98/02842

§ 371 Date: Nov. 12, 1999

§ 102(e) Date: Nov. 12, 1999

(87) PCT Pub. No.: WO98/51747

PCT Pub. Date: Nov. 19, 1998

(30) Foreign Application Priority Data

May 13, 1997 (DE) .............................................. 197 19 948
Oct. 23, 1997 (DE) .............................................. 197 46 885

(51) Int. Cl.$^7$ .................................................... B32B 27/36
(52) U.S. Cl. .............................................................. 428/412
(58) Field of Search ............................................. 428/412

(56) References Cited

PUBLICATIONS

H. Gleiter, Nanocrystalline Materials, Pergamom Press, Oxford, 1989.*

* cited by examiner

*Primary Examiner*—Terressa M. Boykin
(74) *Attorney, Agent, or Firm*—Heller Ehrman White & McAuliffe LLP

(57) ABSTRACT

Described are nanostructured molded articles and layers which are produced by a wet chemical process comprising the following steps:

a) provision of a free-flowing composition containing solid nanoscaled inorganic particles having polymerizable and/or polycondensable organic surface groups;

b) introduction of said composition of step a) into a mold; or b2) application of said composition of step a) onto a substrate; and c) polymerization and/or polycondensation of the surface groups of said solid particles with formation of a cured molded article or a cured layer.

28 Claims, No Drawings

NANOSTRUCTURED MOULDED BODIES AND LAYERS AND METHOD FOR PRODUCING SAME

The present invention relates to nanostructured moulded articles and layers as well as to processes for their production. Particularly, the present invention relates to nanostructured moulded articles and layers which can be produced by means of a wet chemical process.

Nanostructured materials have been known for quite a while. They are usually prepared by densification of nanoscaled particles having diameters in the lower nanometer range by a suitable process (see, e.g., H. Gleiter, Nanocrystalline Materials, Pergamon Press, Oxford, 1989). This is done mostly under high pressure, taking advantage of the high diffusion rates in the outer districts of the nanoscaled particles. Under the action of pressure (and as the case may be, simultaneous action of elevated temperatures) a densification to form dense articles takes place thereby. Corresponding wet chemical processes such as, e.g., the sol-gel process usually result in porous gels since, although due to the high surface activity of the particles a bonding thereof takes place, a tight joining together of the particles and a filling of the gussets does not occur. Materials prepared by such processes are uniform, i.e., they have interfacial phases the composition whereof is not (significantly) different from that of the particle phase (only the gaseous phase of the environment may be additionally present).

It has now surprisingly been found that if said nanoscaled particles are provided with polymerizable and/or polycondensable organic surface groups and said surface groups are polymerized and/or polycondensed, systems of nanostructured materials equivalent or even superior to those which have so far been prepared via the dry route are available via the wet chemical route. Particularly, highly transparent materials are also available via said route since due to the small distances between the particles (one to a few nm) the correlation lengths for the Raleigh scattering are not reached.

Subject of the present invention thus is a process for the production of nanostructured moulded articles and layers comprising the following steps:

a) provision of a free-flowing composition which contains solid nanoscaled inorganic particles having polymerizable and/or polycondensable organic surface groups;

1) introduction of the composition of step a) into a mould; or 2) application of the composition of step a) onto a substrate;

c) polymerization and/or polycondensation of said organic surface groups of said solid inorganic particles with formation of a cured moulded article or a cured layer.

It may be advantageous in many cases to conduct, subsequent to the above step c), a thermal post-treatment of said cured moulded article or said cured layer, respectively, preferably at a temperature ranging from 60 to 150° C., particularly from 80 to 130° C.

Alternatively or in addition thereto, a (further) thermal densification of said moulded article or said layer, respectively, at a temperature of at least 250° C., preferably at least 400° C. and particularly at least 500° C., may be effected. In the case of a layer on a substrate thermal densification may naturally only be carried out if the substrate material can resist such high temperatures without impairment, as this is the case with, e.g., glass and many metals and metal alloys, respectively (but also with some plastics).

In some cases it may be recommendable to carry out a (further) thermal densification at temperatures ranging from 800 to 1500° C., preferably 1000 to 1400° C.

(Post-)treatment at temperatures of at least 350° C. generally makes it possible to utilize said solid nanoscaled inorganic particles as firm precursor for the production of an exclusively inorganic solid.

In the present description and the appended claims the term "solid nanoscaled inorganic particles" is to denote particles having a mean particle size (a mean particle diameter) not exceeding 200 nm, preferably not exceeding 100 nm and particularly not exceeding 70 nm. A particularly preferred range of particle sizes is from 5 to 50 nm.

The solid nanoscaled inorganic particles may consist of any material but preferably they consist of metals and particularly of metal compounds such as (optionally hydrated) oxides, such as $ZnO$, $CdO$, $SiO_2$, $TiO_2$, $ZrO_2$, $CeO_2$, $SnO_2$, $Al_2O_3$, $In_2O_3$, $La_2O_3$, $Fe_2O_3$, $Cu_2O$, $Ta_2O_5$, $Nb_2O_5$, $V_2O_5$, $MoO_3$ or $WO_3$; chalcogenides such as sulfides (e.g. $CdS$, $ZnS$, $PbS$ and $Ag_2S$), selenides (e.g. $GaSe$, $CdSe$ and $ZnSe$) and tellurides (e.g. $ZnTe$ or $CdTe$), halides such as $AgCl$, $AgBr$, $AgI$, $CuCl$, $CuBr$, $CdI_2$ and $PbI_2$; carbides such as $CdC_2$ or $SiC$; arsenides such as $AlAs$, $GaAs$ and $GeAs$; antimonides such as $InSb$; nitrides such as $BN$, $AlN$, $Si_3N_4$ and $Ti_3N_4$; phosphides such as $GaP$, $InP$, $Zn_3P_2$ and $Cd_3P_2$; phosphates, silicates, zirconates, aluminates, stannates and the corresponding mixed oxides (e.g. those having a perovskite structure such as $BaTiO_3$ and $PbTiO_3$).

Preferably, the solid nanoscaled inorganic particles employed in step a) of the process according to the present invention are those of oxides, sulfides, selenides and tellurides of metals and mixtures thereof. Particularly preferred according to the present invention are nanoscaled particles of $SiO_2$, $TiO_2$, $ZrO_2$, $ZnO$, $Ta_2O_5$, $SnO_2$ and $Al_2O_3$ (in any modification, particularly in the form of boehmite, $AlO(OH)$) as well as mixtures thereof.

Since the nanoscaled particles employable according to the present invention cover a broad range of refractive indices, the refractive index of a moulded article or a layer, respectively, can conveniently be set at the desired value by appropriately selecting said nanoscaled particles.

The production of the nanoscaled solid particles employed according to the present invention may be effected in usual manner, e.g., by flame pyrolysis, plasma processes, condensation processes in the gas phase, colloid techniques, precipitation processes, sol-gel processes, controlled nucleation and growth processes, MOCVD processes and (micro)emulsion processes. Said processes are described in detail in the literature. Particularly, metals (for example following the reduction of the precipitation processes), ceramic oxide systems (by precipitation from solution) but also salt-like or multicomponent systems may, for example, be used. The salt-like or multicomponent systems also encompass semiconductor systems.

The preparation of said solid nanoscaled inorganic particles provided with polymerizable and/or polycondensable organic surface groups may on principle be carried out via two different routes, i.e., on the one hand by surface modification of preformed solid nanoscaled inorganic particles and, on the other hand, by preparation of said solid nanoscaled inorganic particles using one or more compounds having such polymerizable and/or polycondensable groupings. Said two approaches will be explained in more detail further below and in the examples.

Said organic polymerizable and/or polycondensable surface groups may be any groups known to the skilled person which can undergo a radical, cationic or anionic, thermal or photochemical polymerization or thermal or photochemical poly-condensation (optionally in the presence of a suitable initiator or catalyst, respectively). Surface groups which are preferred according to the present invention are those having a (meth)acrylic, acrylic, vinylic or epoxy group, (meth)acrylic and epoxy groups being particularly preferred. Among the polycondensable groups hydroxy, carboxy and amino groups may particularly be cited, said groups making it possible to obtain ether, ester and amide linkages between said nanoscaled particles.

According to the present invention it is also preferred that said organic groups present on the surfaces of said nanoscaled particles and comprising said polymerizable and/or polycondensable groups have a relatively low molecular weight. In particular, the molecular weight of said (purely organic) groups should not exceed 500 and preferably not exceed 300, particularly preferred not exceed 200. Of course this does not exclude a significantly higher molecular weight of the compounds (molecules) comprising said groups (e.g. 1000 and more).

As already mentioned above the polymerizable/polycondensable surface groups may on principle be provided via two different routes. In the case where a surface modification of previously prepared nanoscaled particles is carried out, any compounds (preferably of low molecular weight) which on the one hand have one or several groups capable of reacting or at least interacting with (functional) groups present on the surfaces of said nanoscaled solid particles (such as OH groups in the case of oxides) and on the other hand feature at least one polymerizable/polycondensable group are suitable for said purpose. Thus the corresponding compounds may, for example, form both covalent and ionic (salt-like) or coordination (complex) bonds with the surfaces of said nanoscaled solid particles, while as examples of pure interactions dipole-dipole interactions, hydrogen bonding and van der Waals interactions may be mentioned. The formation of covalent and/or coordination bonds is preferred. Specific examples of organic compounds which may be used for the surface modification of said nanoscaled particles or inorganic solid are, for example, unsaturated carboxylic acids such as acrylic acid and methacrylic acid, β-dicarbonyl compounds (e.g. β-diketones or β-carbonylcarboxylic acids) having polymerizable double bonds, ethylenically unsaturated alcohols and amines, epoxides and the like. According to the present invention, hydrolytically condensable silanes having at least (and preferably) one non-hydrolyzable radical featuring a polymerizable carbon-to-carbon double bond or an epoxide ring are particularly preferred —especially in the case of oxide particles. Preferably such silanes are of the general formula (I):

wherein X is $CH_2=CR^3-COO$, $CH_2=CH$ oder glycidyloxy, $R^3$ represents hydrogen or methyl, $R^1$ is a divalent hydrocarbon radical having 1 to 10, particularly 1 to 6 carbon atoms which optionally contains one or more heteroatomic groups (e.g. O, S, NH) separating adjacent carbon atoms, and the radicals $R^2$, the same or different from each other, are selected from alkoxy, aryloxy, acyloxy and alkylcarbonyl groups as well as halogen atoms (particularly F, Cl and/or Br).

Preferably said groups $R^2$ are identical and selected from halogen atoms, $C_{1-4}$ alkoxy groups (e.g. methoxy, ethoxy, n-propoxy, i-propoxy and butoxy), $C_{6-10}$ aryloxy groups (e.g. phenoxy), $C_{1-4}$ acyloxy groups (e.g. acetoxy and propionyloxy) and $C_{2-10}$ alkylcarbonyl groups (e.g. acetyl).

Particularly preferred radicals $R^2$ are $C_{1-4}$ alkoxy groups and especially methoxy and ethoxy.

The radical $R^1$ preferably is an alkylene group, particularly one having 1 to 6 carbon atoms such as, e.g., ethylene, propylene, butylene and hexylene. If X represents $CH_2=CH$, $R^1$ is preferably methylene and in this case may also represent a mere bond.

Preferably X is $CH_2=CR^3-COO$ ($R^3$ preferably being $CH_3$) or glycidyloxy. Particularly preferred silanes of general formula (I) thus are (meth)acryloyloxyalkyltrialkoxysilanes such as, e.g., 3-methacryloyloxypropyltri(m)ethoxysilane and glycidyloxyalkyltrialkoxysilanes such as 3-glycidyloxypropyltri(m)ethoxysilane.

If said nanoscaled particles of inorganic solid have already been prepared by using one or more compounds featuring polymerizable/polycondensable groups a subsequent surface modification may be dispensed with (although same is, of course, possible as additional measure).

The in situ preparation of solid nanoscaled inorganic particles having polymerizable/polycondensable surface groups will in the following be explained for the case of $SiO_2$ particles. For said purpose said $SiO_2$ particles may, for example, be prepared according to the sol-gel process using at least one hydrolytically polycondensable silane featuring at least one polymerizable/polycondensable group. Suitable examples of such silanes are the silanes of general formula (I) already described above. Said silanes are preferably used either alone or in combination with a suitable silane of general formula (II)

$$SiR^2_4 \qquad (II)$$

wherein $R^2$ has the meaning defined above. Preferred silanes of the above general formula (II) are tetramethoxysilane and tetraethoxysilane.

It is of course also possible to use, in addition or alternatively to the silanes of general formula (II), other silanes, e.g., those having a (non-hydrolyzable) hydrocarbon group without any functional group such as, e.g., methyl or phenyl trialkoxysilanes. Especially if an easy to clean surface of the moulded article or the layer is desired, it may be recommendable to use, apart from the silanes of general formula (I) and optionally of general formula (II), a certain amount (e.g. up to 60 and particularly up to 50% by moles based on the total of silanes employed) of silanes having fluorine containing (non-hydrolyzable) radicals, particularly hydrocarbon radicals. Particularly preferred here are silanes of general formula (I), wherein $R^2$ is defined as above, $R^1$ is an ethylene group and X is a perfluoroalkyl group having 2 to 12, preferably 4 to 8 carbon atoms. Further silanes employable for said purpose are, for example, those having (per)fluorinated aryl (particularly phenyl) groups. Such fluorinated silanes may, of course, also be employed for the surface modification of previously prepared solid nanoscaled inorganic particles.

The material employed in step a) of the process according to the present invention is present in the form of a still free-flowing composition (suspension). The liquid component of said composition is composed of, e.g., water and/or (preferably water-miscible) organic solvent and/or compounds employed or formed in the course of the preparation of the nanoscaled particles or the surface modification thereof (e.g. alcohols in the case of alkoxysilanes). Suitable organic solvents which may optionally be employed additionally are, for example, alcohols, ethers, ketones, esters, amides and the like. However, an (additional) component of said free-flowing composition may, for example, also be constituted by at least one monomeric or oligomeric species featuring at least one group capable of reacting (polymerizing or polycondensing, respectively) with polymerizable/polycondensable groups present on the surface of said nanoscaled particles. As examples of such species monomers having a polymerizable double bond such as acrylic acid esters, methacrylic acid esters, styrene, vinyl acetate and vinyl chloride may be cited. As (preferably employed) monomeric compounds having more than one polymerizable bond there may particularly be mentioned those of general formula (III):

 (III)

wherein
n=2, 3 or 4, preferably 2 or 3, and particularly 2;
Z=O or NH, preferably O;
$R^3$=H, $CH_3$;
A=n-valent hydrocarbon radical having 2 to 30, particularly 2 to 20 carbon atoms which may feature one or more heteroatomic groups, each located between adjacent carbon atoms (examples of such heteroatomic groups being O, S, NH, NR (R≦hydrocarbon radical), preferably O).

Furthermore, the hydrocarbon radical A may carry one or more substituents, preferably selected from halogen (particularly F, Cl and/or Br), alkoxy (particularly $C_{1-4}$ alkoxy), hydroxy, optionally substituted amino, $NO_2$, $OCOR^5$, $COR^5$ ($R^5$=$C_{1-6}$ alkyl or phenyl). Preferably, however, the radical A is unsubstituted or substituted by halogen and/or hydroxy.

In a particularly preferred embodiment of the present invention, A is derived from an aliphatic diol, an alkylene glycol, a polyalkylene glycol or an optionally alkoxylated (e.g. ethoxylated) bisphenol (e.g. bisphenol A).

Further examples of employable compounds having more than one double bond are allyl(meth)acrylate, divinylbenzene and diallylphthalate. Also employable is, for example, a compound having two or more epoxy groups (in case epoxide containing surface groups are employed), e.g., bisphenol A diglycidylether, or also an (oligomeric) precondensate of an epoxy group containing hydrolyzable silane (e.g. glycidoxypropyltrimethoxysilane).

If additional monomeric compounds having polymerizable/poly-condensable groups are employed they preferably account for not more than 40%, particularly not more than 30%, and particularly preferred not more than 15% by weight of the total solids content of the free-flowing composition of step a).

In step b) of the process according to the present invention said free-flowing composition of step a) is either introduced into a suitable mould in order to produce a moulded article, or is applied onto a desired substrate in order to coat said substrate completely or partially. The coating methods suitable for said purpose are the common ones known to the skilled person. Examples thereof are dip coating, spray coating, doctor blade coating, painting, brushing, spin coating, etc.

Prior to introduction into the mould or application onto a substrate, said free-flowing composition may be adjusted to a suitable viscosity, for example by adding solvent or evaporating volatile components (particularly solvent already present).

Substrates made of any material, particularly of plastics, metals and glass, are suitable for being coated with the free-flowing composition of step a) of the process according to the present invention. Prior to the application of said free-flowing composition said substrate materials may optionally be subjected to a surface treatment (e.g. degreasing, roughening, corona discharge, treatment with a primer, etc.). Especially when substrates made of plastics are coated a suitable adhesion may be provided by adding a suitable monomeric polymerizable compound and/or according to the preferred embodiment described in more detail below.

Among the metal substrates which may be coated according to the present invention metals such as aluminum, copper, zinc, nickel and chromium, and metal alloys such as (stainless) steel, brass and bronze may be mentioned as examples. Examples for suitable substrates made of plastics are those made of polycarbonate, polyesters, polyamides, polystyrene, poly(meth)acrylates (e.g. polymethylmethacrylate), PVC, polyolefins (such as polyethylene and polypropylene), rubbers (ABS, NBS, etc.) and polyphenylenesulfide, to name but the most important ones.

In step c) of the process according to the present invention a polymerization and/or polycondensation of the polymerizable/polycondensable surface groups of said solid nanoscaled inorganic particles (and, optionally, of the poylmerizable/polycondensable groups of the monomeric or oligomeric species additionally employed) is carried out. Said polymerization/polycondensation may be carried out in a manner known to the person skilled in the art. Examples of suitable processes are thermal, photochemical (e.g. by means of UV radiation), electron beam curing, laser curing, room temperature curing, etc. Such a polymerization/polycondensation is optionally effected in the presence of a suitable catalyst or starter (initiator), respectively, which is added to said free-flowing composition of step a) at the latest immediately before the introduction thereof into the mould or the application thereof onto the substrate, respectively.

As starters/starter systems the conventional ones known to the skilled person are envisaged, including radical photostarters, radical thermostarters, cationic photostarters, cationic thermostarters and any combination thereof.

Specific examples of employable radical photostarters are Irgacure® 184 (1-hydroxycyclohexylphenylketone), Irgacure® 500 (1-hydroxycyclohexylphenylketone, benzophenone) and other photoinitiators of the Irgacure® type available from the company Ciba-Geigy; Darocur® 1173, 1116, 1398, 1174 and 1020 (available from the company Merck); benzophenone, 2-chlorothioxanthone, 2-methylthioxanthone, 2-isopropylthioxanthone, benzoin, 4,4'-dimethoxybenzoin, benzoin ethylether, benzoin isopropylether, benzil dimethylketal, 1,1,1-trichloroacetophenone, diethoxyacetophenone and dibenzosuberone.

Examples of radical thermostarters are, i.a., organic peroxides in the form of diacylperoxides, peroxydicarbonates, alkylperesters, alkylperoxides, perketals, ketoneperoxides and alkylhydroperoxides as well as azo compounds. As specific examples thereof dibenzoylperoxide, tert-butylperbenzoate and azobisisobutyronitrile may particularly be mentioned.

An example for a cationic photostarter is Cyracure® UVI-6974, while 1-methylimidazole is a preferred cationic thermostarter.

Said starters will be employed in the conventional amounts known to the skilled person (preferably 0.01–5%, particularly 0.1–2% by wt. based on the total solids content of the free-flowing composition of step a)). Under certain circumstances it is of course possible to completely dispense with the starter, e.g., in the case of electron beam or laser curing.

Said polymerization/polycondensation of step c) of the process according to the present invention is preferably carried out thermally or by irradiation (particularly with UV light). Particularly preferred is a photochemical polymerization/polycondensation or a combination of thermal and photochemical polymerization/polycondensation, respectively.

Said polymerization/polycondensation may be preceded by a removal of further volatile, non-polymerizable/non-polycondensable compounds from the composition present in the mould or on the substrate, respectively. Said removal of volatile components may, however, be effected also or additionally, respectively, at the polymerization/polycondensation stage or thereafter.

In the following, a typical process according to the present invention which may result in transparent moulded articles will be outlined by way of example, the value ranges and procedures given being of general validity, irrespective of the specific materials employed.

Nanoscaled particles of, e.g., $SiO_2$, $TiO_2$, $ZrO_2$ and other oxidic or sulfidic materials (particle size 30 to 100 nm, preferably 40 to 70 nm) are dispersed in a solvent (for example, in a lower alcohol such as methanol, ethanol, propanol) at a concentration of 1 to 20%, preferably 5 to 15% by weight, and added thereto is a surface modifier having polymerizable/polycondensable groups in an amount of preferably 2 to 25%, particularly 4 to 15% by weight (based on the total solids content). In the case of, for example, silanes said surface modification may be effected by stirring at room temperature for several hours. Subsequently a monomeric or oligomeric material having polymerizable/polycondensable groups and being compatible with said surface modifier and the surface groups, respectively, may optionally be added in an amount of, for example, up to 20%, preferably 4 to 15% by weight (based on the total solids content). Following the addition of one or more suitable starters (each in an amount of, e.g., 0.01 to 1%, preferably 0.1 to 0.5% by weight, based on the total solids content) the solvent is partially removed (preferably 50 to 98%, particularly 75 to 95% thereof. The still free-flowing composition is then placed in the desired mould, whereafter the residual solvent is removed. Then a first curing operation is carried out. In order to reduce the reaction times, a photopolymerization is preferably employed; any light sources, particularly sources emitting UV radiation, are employable here (e.g. mercury lamps, xenon lamps, laser light, etc.). Curing by laser light permits application for the so-called "rapid prototyping". Following a thermal post-curing for the further densification of the structure (e.g. 0.5–4 hours at 70 to 150° C., preferably 1–2 hours at 80 to 100° C.) a green compact is obtained. Said green compact may be heated to a temperature of, e.g., 500° C., for example within 2 to 10 hours, preferably 3 to 5 hours, and kept at said temperature, e.g. for 2 to 10 hours (preferably 3 to 5 hours). In most cases said step results in the complete loss of said organic (carbon containing) groups in said moulded article. For final densification said moulded article may then be heated to a temperature of, e.g., 1400° C., for example within 2 to 10 hours (preferably 3–5 hours), and be kept at said temperature for, e.g., 1 to 5 hours (preferably 2–3 hours). Thereby a colorless, transparent, purely inorganic moulded article may be obtained.

The production of a layer may, for example, be carried out by adding to sols featuring, for example, oxidic or sulfidic nanoparticles hydrolyzable silanes having polymerizable/polycondensable groups at a concentration of preferably not more than 100%, particularly not more than 75% by weight (based on said nano-particles). Following the adjustment of the viscosity by addition or removal, respectively, of solvent (e.g. alcohol) and after the addition of a photoinitiator (e.g. at a concentration of 5% by weight based on the silane employed) a curing of the layer on the selected substrate with preferably UV light results in transparent, crack-free and homogeneous layers. A thermal post-treatment at, for example, 60 to 100° C. usually results in a significant improvement in the layer properties; said post-treatment is, however, not indispensable. The layers thus produced have good abrasion resistance. Since in said process the thermal post-treatment may be carried out at relatively low temperatures, substrates having low thermal stability may also be used without any problems. As already mentioned above, the adhesion of the layer to the substrate may be adjusted by varying the amount and type of silane employed and by adding an additional organic monomer (methacrylate, acrylate, etc.) at low concentrations (for example, <5% by wt.), thereby, for example, both glass and plastics may be coated. The co-use of the fluorinated silanes mentioned above in the surface modification furthermore results in easy-to-clean layers on the corresponding substrates and in a reduction of the surface energy, respectively, while the addition of, e.g., surfactants can increase the surface energy.

According to a preferred embodiment of the present invention, especially for the coating of substrates made of plastics, nanoparticles (particularly those of AlOOH, $ZrO_2$, $TiO_2$ and the like) are dispersed at relatively high concentrations (usually at least 15% and preferably at least 20% by wt. or at least 7% or 10%, respectively, by volume, preferred upper limits being 80% by wt., particularly 60% by wt. or 40% by volume, particularly 25% by volume, respectively) in a liquid system comprising as essential component at least one hydrolyzable silane featuring a polymerizable/polycondensable group (e.g. one of the above general formula (I)) and subsequently a (conventional) prehydrolysis of said silane is carried out. In addition to said silane featuring a polymerizable/polycondensable group other hydrolyzable components may optionally be present, particularly other (optionally fluorinated) silanes (e.g. those of the above general formula (II)) and/or hydrolyzable compounds (e.g. alkoxides, halides) of metals of the main and sub-groups of the Periodic Table (e.g. Al, Ti, Zr). After the prehydrolysis, further species having more than one (preferably two) copolymerizable/copolycondensable groups (in particular those of the above general formula (III), preferably in amounts of up to 40%, particularly up to 30% and particularly preferred up to 15% by wt.) may be added. As polymerizable groups (meth)acrylate groups are particularly preferred. Prior to the application onto a plastic substrate a solvent (e.g. an alcohol) may be added to said system in order to adjust the viscosity thereof, as well as conventional paint additives (see below). Although the resulting coating composition may be cured thermally (preferably following the addition of a corresponding thermostarter) it has surprisingly been found that when using a photoinitiator (preferably in the conventional amounts given above) even a (sole) photochemical curing (preferably by UV light) results in a highly scratch-resistant, transparent layer which, moreover, shows good adhesion to most plastics substrates without pretreatment of the surfaces thereof (e.g. in the case of polycarbonates, polystyrene, poly(meth)acrylate, etc.).

Of course, dyes, pigments, matting agents, etc. may be added to the corresponding coating composition if a colored or non-transparent, respectively, layer is desired. Examples of further conventional additives for compositions of the described type are flow additives, UV absorbers, antioxidants (e.g. HALS), antistatic agents, surfactants (for hydrophilic surfaces) and fluorinated compounds (for hydrophobic/oleophobic surfaces).

An additional advantage of proceeding in the manner just described is that a solvent exchange prior to the application, as often described in the prior art, is not necessary since one preferably operates without separately added solvent (except in order to adjust the viscosity after prehydrolysis).

The moulded articles available according to the present invention are suitable for a number of applications. Only by way of example, the following fields of application may be mentioned in the present context: rapid prototyping, e.g. in the medical field (for prostheses, simulation of organs), prototyping in the field of automobiles (design models, motor components, etc.), optical elements, development of dies, development of testing procedures.

In the case of the layers according to the present invention scratch-resistant coatings having functional properties (antireflex, protection against corrosion, hydrophilic properties, hydrophobic properties, antistatic layers) may be mentioned. Coatable materials include those made of transparent and non-transparent plastics, glass, metals, stone, wood, paper and textiles but are not limited thereto.

The above coating compositions are particularly suitable for the coating of constructions and parts thereof; means of locomotion and of transport and parts thereof; operating equipment, devices and machines for commercial and industrial purposes and research, and parts thereof; domestic articles and household equipment and parts thereof; equipment, apparatus and accessories for games, sport and leisure, and parts thereof; and also instruments, accessories and devices for medical purposes and the sick. Said compositions are also highly suitable for the provision of interference layers. Specific examples of coatable materials and articles are indicated below.

Constructions (Especially Buildings) and Parts Thereof

Interior and exterior facings of buildings, floors and staircases made of natural stone, concrete, etc., floor coverings of plastic, fifted and loose carpets, base boards (skirting boards), windows (especially window frames, window sills, glazing of glass or plastic and window handles), Venetian blinds, roller blinds, doors, door handles, WC, bath and kitchen fittings, shower cabinets, sanitary modules, lavatories, pipes, radiators, mirrors, light switches, wall and floor tiles, lighting, letter boxes, roof tiles, guttering, aerials, satellite dishes, handrails of balconies and moving stairways, architectural glazing, solar collectors, winter gardens, walls of lifts; memorials, sculptures and, generally, works of art made of natural stone (e.g. granite, marble), metal, etc., especially those erected outdoors.

Means of Locomotion and of Transport (e.g. Car, Truck, Bus, Motorbike, Moped, Bicycle, Railway, Tram, Ship and Aircraft) and Parts Thereof Headlamps, interior and exterior mirrors, windscreens, rear windows, side windows, mudguards of bicycles and motorbikes, plastic visors of motorbikes, instruments of motorbikes, seats, saddles, door handles, steering wheels, tire rims, fuel-tank ports (especially for diesel), number plates, luggage racks, roof containers for cars, and cockpits.

Operating Equipment, Devices and Machines for Commercial and Industrial Purposes and Research and Parts Thereof Moulds (e.g. casting moulds, especially those made of metal), hoppers, filling units, extruders, water wheels, rollers, conveyor belts, printing presses, screen-printing stencils, dispending machines, (machine) housings, injection-moulded components, drill bits, turbines, pipes (interior and exterior), pumps, sawblades, screens (for example for scales), keyboards, switches, knobs, ball bearings, shafts, screws, displays, solar cells, solar units, tools, tool handles, containers for liquids, insulators, capillary tubes, lenses, laboratory equipment (e.g. chromatography columns and hoods) and computers (especially casings and monitor screens).

Domestic Articles and Household Equipment and Parts Thereof

Furniture veneers, furniture strips, rubbish bins, toilet brushes, table cloths, crockery (for example made of porcelain and stoneware), glassware, cutlery (e.g. knives), trays, frying pans, saucepans, baking sheets, cooking utensils (e.g. cooking spoons, graters, garlic presses, etc.), inset cooking plates, hotplates, ovens (inside and outside), flower vases, covers for wall clocks, TV equipment (especially screens), stereo equipment, housings of (electrical) domestic equipment, picture glass, Christmas tree baubles, wall paper, lamps and lights, upholstered furniture, articles of leather.

Equipment, Apparatus and Accessories for Games, Sport and Leisure

Garden furniture, garden equipment, greenhouses (especially glazed), tools, playground equipment (e.g. slides), balls, airbeds, tennis rackets, table-tennis bats, table-tennis tables, skis, snow boards, surf boards, golf clubs, dumb-bells, benches in parks, playgrounds, etc., motor bike clothing, motor bike helmets, ski suits, ski boots, ski goggles, crash helmets for skiers, wet-suits and diving goggles.

Instruments, Accessories and Devices for Medical Purposes and the Sick

Prostheses (especially for the limbs), implants, catheters, anal prostheses, dental braces, false teeth, spectacles (lenses and frames), medical instruments (for operations and dental treatment), plaster casts, clinical thermometers and wheelchairs, and also, quite generally, hospital equipment.

In addition to the above articles it is also possible, of course, to coat other articles and parts thereof, advantageously, with the above coating compositions, examples being jewellery, coins, works of art (for example paintings), book covers, gravestones, urns, signs (for example traffic signs), neon signs, traffic light pillars, CDs, wet-weather clothing, textiles, postboxes, telephone booths, shelters for public transport, protective goggles, protective helmets, films (for example for packaging foods), telephones, seals for water taps, and quite generally all articles produced from rubber, bottles, light-, heat- or pressure-sensitive recording materials (before or after recording, for example photos), and church windows.

With Respect to the Interference Layers Mentioned Above the Following Exemplary Applications May be Cited Optical filters: anti-reflex and reflex filters in the field of glasses, displays, screens, semiconductor lasers, microlens coatings, solar cells, "damage-resistant" laser layers.

Holographic layers: light guide systems, recording of information, laser coupling, waveguides, decoration and architecture.

Embossable layers: dereflection systems, focussing in detector fields, lighting of flat screens, image formation in photocopying devices, fiber optics (input of light).

Lithography: production of microoptical components of waveguides, gratings, pinholes, diffraction gratings (point lattices), as well as in the fields of display technology, fiber chip coupling and imaging optics.

Bakable layers: color filters on metals, interference filters on glass such as, e.g., band pass filters, anti-reflex filters, absorption filters and beam splitting devices.

The following examples serve to further illustrate the present invention.

EXAMPLE 1

Production of a Transparent SiO$_2$ Moulded Article Free of Organic Components

SiO$_2$ particles (OX-50, primary particle size 40 nm) are dispersed in isopropanol at a concentration of 10% by wt. with stirring and ultrasound for about 30 minutes. Thereafter, 3-methacryloxypropyltrimethoxysilane (MPTS) is added slowly and under stirring in an amount of 6% by wt. based on the SiO$_2$ content. A silanization of said SiO$_2$ particles is achieved by stirring at 50° C. for 3 hours. Then 6% by wt. (based on the total solids content) of tetraethyleneglycol dimethacrylate (TEGDMA) are added, and stirring is continued for another 15 minutes. Finally, 2% by moles of Irgacure® 184 (Ciba-Geigy) per mole of double bonds are added as photostarter for the UV polymerization. Subsequently the solvent is partially removed in vacuo (distilling off the alcohol completely results in gelling so that a free-flowing and pourable, respectively, suspension cannot be obtained anymore). The suspension thus obtained may then serve directly for the production of bulk materials by photopolymerization.

For said purpose, said SiO$_2$/MPTS/TEGDMA system is poured into a mould made of polyethylene. The viscous sol is again treated in vacuo (100 mbar) for 1 hour at 25° C. in order to degasify it. A combinded UV/IR dryer (Beltron Company) is used to crosslink the organic components. The output of the mercury lamps is 400 mW/m$^2$ each. The entire photopolymerization of a bulk of 5 mm in thickness is achieved by an exposure amount of 240 J/cm$^2$. Said photopolymerization results in a dimensionally stable article. A crackless drying operation of the photopolymerized bulk is carried out by treatment in an oven at 80° C. within one hour. Thereby a solvent-free and binder-containing SiO$_2$ moulded article corresponding to a ceramic green compact is obtained. In order to burn out the residual organic components, the temperature of the oven is increased from 80° C. to 500° C. within 3 hours, the latter temperature being maintained for another 3 hours. This leads to a porous SiO$_2$ bulk which is free of organic groups, as can be concluded from IR spectroscopical measurements. Finally, the temperature is increased from 500° C. to 1400° C. within 3 hours and the latter temperature is then maintained for another 2 hours. Thus, a transparent moulded article is finally obtained.

EXAMPLE 2

Production of a Transparent ZrO$_2$ Moulded Article Free of Organic Components

Nanoscaled zirconium oxide particles ("TOSOH Zirconia TZ-8Y" having a primary particle size of 90 nm) are dispersed in isopropanol with stirring and under the action of ultrasound. For surface modification, 3.2% by wt. (based on the content of ZrO$_2$) of MPTS are added to said suspension with stirring. A silanization of the ZrO$_2$ particles is achieved after 3 hours of stirring at 50° C. Thereafter, 3.2% by wt. (based on the content of ZrO$_2$) of TEGDMA are added, and stirring is continued for another 15 minutes at 20° C. As photostarter, 3% by moles of Irgacure® 184 per mole of double bonds are then added. This is followed by a partial removal of the solvent in vacuo. The free-flowing suspension thus obtained serves directly for the production of bulk materials by photopolymerization. In order to obtain a moulded article having a thickness of 5 mm, an output of 350 J/cm$^2$ is employed.

Crackless drying of the photopolymerizable bulk is achieved by treating said photopolymerized moulded article in an oven at 80° C. within 30 minutes. This results in a solvent-free and binder-containing ZrO$_2$ bulk corresponding to a ceramic green compact. In order to burn out the residual carbon content, the temperature of the oven is raised from 80° C. to 450° C. within 3 hours, whereafter the latter temperature is maintained for another 3 hours. A porous ZrO$_2$ bulk free of organic groups is thus obtained. Finally, the temperature is increased from 450° C. to 1400° C. within 3 hours and maintained at the latter value for another 4 hours. The sintered moulded article obtained thereby is translucent to opaque.

EXAMPLE 3

Synthesis of a Sol for the Production of Layers of High Reflective Index 86.861 g of TiO$_2$ sol (3.5% by wt. of TiO$_2$ in isopropanol; particle size: 5 nm) are added to 1.989 g of tributylphosphate and stirring is conducted for 1 hour. Then a solution of 1.2 g of distilled γ-glycidyloxypropyltrimethoxysilane (GPTS) in 100 g of 2-isopropoxyethanol is added dropwise at 100° C. to said sol. After 1 hour of stirring the mixture is cooled to room temperature and 0.8775 g of hydrolyzed GPTS (prepared by adding 2.70 g of 0.1 N HCl to 23.63 g of distilled GPTS and stirring for 24 hours and subsequent distilling off of low molecular weight reaction products at 3 mbar) is added thereto. After 15 minutes of stirring the mixture in vacuo (3 mbar), the same is subjected to distillation and subsequently diluted with 120 g of 2-isopropoxyethanol. Thus a transparent, agglomerate-free sol is obtained.

EXAMPLE 4

Synthesis of a Sol for the Production of Layers of Low Refractive Index

To a mixture of 23.63 g of GPTS (distilled) and 12.45 g of tetraethoxysilane (TEOS) there are added 2.88 g of 0.1 N HCl to effect hydrolysis and condensation. Then the resulting reaction mixture is stirred at 20° C. for 24 hours, and then subjected to distillation in vacuo (at 3 mbar) in order to remove components of lower molecular weight. Subsequently the remaining reaction product is diluted with 50 g of isopropoxyethanol as solvent.

EXAMPLE 5

Synthesis of a Sol for the Production of Layers of Low Refractive Index and Additional Easy-to-Clean Function Under stirring, 26.63 g of distilled GPTS are mixed with 8.30 g of TEOS and 0.11 g of 1H,1H,2H,2H-perfluorooctyltriethoxysilane (FTS) for 15 minutes. The resulting sol is hydrolyzed and condensed at 20° C. with 4.5 g of 0.1 N HCl for 4 hours and with stirring. Thereafter, 52.10 g of isopropoxyethanol and 0.53 g of phosphoric acid are added and stirring is continued at 20° C. for another 2 hours.

EXAMPLE 6

Production of a Layer on Glass with the Sol of Example 3

To the sol of Example 3, 0.08 g of Cyracure® UVI-6974 (Ciba-Geigy) and 0.02 g of 1-methylimidazole are added.

After intensive stirring the mixture is filtered and can then be employed as coating composition. Glass plates (10 cm×10 cm×2 mm) are cleaned with 2-propanol and dried in air prior to the coating operation.

The coating composition is applied onto the substrate in a defined manner by spin coating. The layer thickness is controlled by the rotational speed of the substrate.

A combined UV/IR dryer (Beltron Company) is used for curing the layer. The apparatus used features two mercury lamps for irradiation with UV light, a IR radiation device the output whereof can be used to control the surface temperature, and a conveyor belt on which the substrates can be passed under said UVIR irradiation device with defined speed. The output of the mercury lamps is 400 mW/cm$^2$ each.

The IR irradiation device is adjusted to 120° C., the speed of the conveyor belt is 2.6 m/min, and the coated substrates are passed under at these setpoints for a total of three times.

The last curing step is a thermal post-treatment at 120° C. in a circulating air drying cabinet for 15 minutes.

EXAMPLE 7

Production of a Layer on Polycarbonate (PC) Using the Sol of Example 3

Using the coating material of Example 3, polycarbonate plates (10 cm×10 cm×2 mm; pretreatment as described in Example 6) are coated and cured according to the process of Example 6. Differences: the IR irradiation device is set at 100° C., and the last curing step is a thermal post-treatment at 100° C. in a circulating air drying cabinet for 30 minutes.

EXAMPLE 8

Production of a Layer on Polymethylmethacrylate (PMMA) Using the Sol of Example 3

Using the coating material of Example 3, polymethylmethacrylate plates (10 cm×10 cm×2 mm; pretreatment as described in Example 6) are coated and cured according to the process of Example 6. Differences: no IR irradiation, and the last curing step is a thermal post-treatment at 80° C. in a circulation air drying cabinet for 60 minutes.

EXAMPLE 9

Production of a Layer on PC Using the Sol of Example 4

To the coating material of Example 4 there are added 0.72 g of Cyracure® UVI-6974, 0.36 g of 1-methylimidazole and 10 g of a 0.02 percent by weight solution of aluminum tributoxyethanolate in 2-isopropoxyethanol and thoroughly mixed therewith. The necessary dilution is effected by adding 50 g of 2-isopropoxyethanol. Using said coating material, polycarbonate plates (see Example 7) are coated and cured according to the process of Example 7. Differences: the substrates are passed under four times at a speed of the conveyor belt of 2 m/min, and the last curing step is a thermal post-treatment at 100° C. in a circulating air drying cabinet for 60 minutes.

EXAMPLE 10

Production of a Layer on PMMA Using the Sol of Example 4

The procedure of Example 9 is followed, but without use of the IR irradiation device. The last curing step is a thermal post-treatment at 70° C. in a circulating air drying cabinet for 60 minutes.

EXAMPLE 11

Production of a Layer on PC Using the Sol of Example 5

The coating material according to Example 5 is provided with initiators according to Example 8 and cured according to the process described in Example 8.

Properties of the Layers Produced in Examples 6 to 11
Test Methods:

Refractive Index: Ellipsometric

Transmission (500 nm): Spectroscopic (coating the substrates on one side)

Reflection (550 nm): Spectroscopic (backside of substrates uncoated and blackened)

Adhesion (layer on substrate): Cross-cut adhesion test and tape test according to DIN 53151 and DIN 58196

The values thus obtained are summarized in the following table.

| Example No. | Substrate material | Refractive index (550 nm) | Transmission [%] | Reflection [%] | Adhesion |
| --- | --- | --- | --- | --- | --- |
| 6 | Glas | 1.91 | 78.5 | 20 | 0/0 |
| 7 | PC | 1.91 | 81 | 19 | 0/0 |
| 8 | PMMA | 1.91 | 78.5 | 20 | 0/0 |
| 9 | PC | 1.47 | 91 | 8 | 0/0 |
| 10 | PMMA | 1.47 | 91 | 8 | 0/0 |
| 11 | PC | 1.44 | 95 | 2.5 | 0/0 |

EXAMPLE 12

Coating of Substrates Made of Plastic 248.8 g (1 mole) of MPTS there are added with stirring 136.84 g (43% by weight based on the total solids content) of AlOOH nanopowder (Sol P3, 15 nm, Degussa). Hydrolysis is effected by slowly adding thereto 36 g (2 moles) of deionized water and 2.5 hrs of refluxing at 100° C. The cooled prehydrolysate is diluted to a solids content of 45% with 282 g of 1-butanol, and 3.5 g (0.5% by wt.) of Byk®-306 are added thereto as leveling agent. For UV polymerization, 5.46 g (3% by moles based on the double bonds present) of benzophenone are added as photostarter. The application of the coating system onto various plastic materials is effected by spin coating. The curing of the layer is achieved by UV irradiation for 2 minutes by mercury lamp.

The coating shows good adhesion (CC/TT=0/0) without pretreatment of the substrate e.g. on PMMA. After 1000 cycles (Taber-Abraser, CS-10F, 500 g/roll) the sctratch-resistant coating shows an abrasion hardness of 11%.

EXAMPLE 13

Coating of Substrates Made of Plastic

The procedure of Example 12 is repeated with the exception that in addition to benzophenone 1.05 g (1% by moles) of diethanolamine are used as accelerator.

The coating shows good adhesion (CC/TT=0/0) without pretreating the substrate, e.g. on PMMA. After 1000 cycles (Taber-Abraser, CS-10F, 500 g/roll) the scratch-resistant coating has an abrasion hardness of 9%.

EXAMPLE 14

Coating of Substrates Made of Plastic

To 248.8 g (1 mole) of MPTS there are added with stirring 99.52 g (31% by wt. based on the total solids content) of AlOOH nanopowder (Sol P3, 15 nm, Degussa). Hydrolysis is effected by slowly adding thereto 36 g (2 moles) of deionized water and 2.5 hrs of refluxing at 100° C. To the cooled prehydrolysate there are added 49.5 g (15% by moles) of TEGDMA and 3.9 g (0.5% by wt.) of Byk®-306 as leveling agent, and the mixture is diluted to a solids content of 45% with 343 g of 1-butanol. For UV polymerization, 0.6 g (2.5% by moles based on the double bonds present) of benzophenone are added as photostarter. The application of the coating system onto various plastic materials is effected by spin coating. The curing of the layer is carried out by UV irradiation for 2 minutes by means of a mercury lamp.

The coating shows good adhesion (CC/TT=0/0) without pretreatment of the substrate, e.g. on PMMA. After 1000 cycles (Taber-Abraser, CS-10F, 500 g/roll) the scratch-resistant coating has an abrasion hardness of 15%. The dimethacrylate results in an increase in the flexibility and the water stability of the coating. (Maintenance at 65° C. in deionized water>14 days, without dimethacrylate 7 days).

What is claimed is:

1. A process for producing a nanostructured moulded article or layer, comprising the following steps:
   (a) providing a free-flowing composition containing solid nanoscale inorganic particles having polymerizable and/or polycondensable organic surface groups thereon;
   (b1) introducing the composition of step (a) into a mould; or
   (b2) applying the composition of step (a) onto a substrate; and
   (c) polymerizing and/or polycondensing the surface groups of the solid particles, thereby forming a nanostructured moulded article or layer.

2. A process of claim 1, comprising the additional step of thermally post-treating the nanostructured moulded article or layer of step (c).

3. A process of claim 2 where the step of thermally post-treating the nanostructured moulded article or layer is carried out at a temperature ranging from 60° C. to 150° C.

4. A process of claim 1, comprising the additional step of thermally densifying the nanostructured moulded article or layer.

5. A process of claim 4 where the step of thermally densifying the nanostructured moulded article or layer is carried out at a temperature of at least 20° C.

6. A process of claim 5 where the step of thermally densifying the nanostructured moulded article or layer is carried out at a temperature of at least 400° C.

7. A process of claim 1 where the solid nanoscale inorganic particles are particles of metal compounds.

8. A process of claim 7 where the solid nanoscale inorganic particles are particles of the oxides, sulfides, selenides, and tellurides of metals, and mixtures thereof.

9. A process of claim 8 where the solid nanoscale inorganic particles are particles of $SiO_2$, $TiO_2$, $ZrO_2$, $ZnO$, $Ta_2O_5$, $SnO_2$, $Al_2O_3$, and mixtures thereof.

10. A process of claim 1 where the polymerizable and/or polycondensable surface groups are acrylic, methacrylic, vinylic, allylic or epoxy groups.

11. A process of claim 1 where the solid nanoscale inorganic particles used in step (a) are prepared by surface modification of solid nanoscale inorganic particles using at least one compound containing a polymerizable and/or polycondensable group.

12. A process of claim 1 where the solid nanoscale inorganic particles are prepared by a sol-gel process.

13. A process of claim 1 where the solid nanoscale inorganic particles of step (a) additionally have fluorinated surface groups present thereon.

14. A process of claim 13 where the fluorinated surface groups have the formula $R_f$—$CH_2$—$CH_2$—, wherein $R_f$ is a perfluoroalkyl radical having 2 to 12 carbon atoms.

15. A process of claim 1 where step (c) is carried out in the presence of polymerizable and/or polycondensable monomeric or oligomeric species not bonded to said solid nanoscale inorganic particles.

16. A process of claim 1 where step (c) is carried out in the presence of a thermoinitiator and/or a photinitiator.

17. A process of claim 1 where step (c) includes a photochemical polymerization and/or polycondensation.

18. A process of claim 1 where the substrate of step (b2) is a plastic, metal, or glass substrate.

19. A nanostructured moulded article prepared by the process of claim 1.

20. A process for producing a nanostructured layer on a plastic substrate, comprising the following steps:
   (a) providing a dispersion of nanoscale metal oxide particles in a system comprising at least one hydrolyzable silane containing at least one polymerizable and/or polycondensable group at a concentration of at least 15% by wt., and subsequently prehydrolyzing the at least one hydrolyzable silane;
   (b) applying the composition of step (a) to a plastic substrate to form a layer; and
   c) photochemically curing the layer of step (b).

21. A process of claim 20 where the nanoscale metal oxide particles are particles of $Al_2O_3$, $TiO_2$ and/or $ZrO_2$.

22. A process of claim 20 where the hydrolyzable silane contains an acrylic, methacrylic, vinylic, or allylic group.

23. A process of claim 20 where the concentration of the nanoscale metal oxide particles in the dispersion of step (a) is at least 20% by wt.

24. A process of claim 23 where the concentration of the nanoscale metal oxide particles in the dispersion of step (a) is at least 30% by wt.

25. A process of claim 20 where the prehydrolyzing step of step (a) is carried out in the absence of separately added organic solvent.

26. A process of claim 20 where a photoinitiator is added is added to the dispersion of step (a) before carrying out step (b).

27. A process of claim 20 where the plastic of the plastic substrate is a polyacrylate, polymethacrylate, polycarbonate, or polystyrene.

28. A plastic substrate provided with a nanostructured layer prepared by the process of claim 20.

* * * * *

UNITED STATES PATENT AND TRADEMARK OFFICE
CERTIFICATE OF CORRECTION

PATENT NO.    : 6,291,070 B1
DATED         : September 18, 2001
INVENTOR(S)   : Arpac et al.

It is certified that error appears in the above-identified patent and that said Letters Patent is hereby corrected as shown below:

Column 15,
Line 52, after "Least", change "20º" to -- 250º --

Signed and Sealed this

Twenty-third Day of July, 2002

*Attest:*

*Attesting Officer*

JAMES E. ROGAN
*Director of the United States Patent and Trademark Office*